United States Patent Office 2,841,036
Patented July 1, 1958

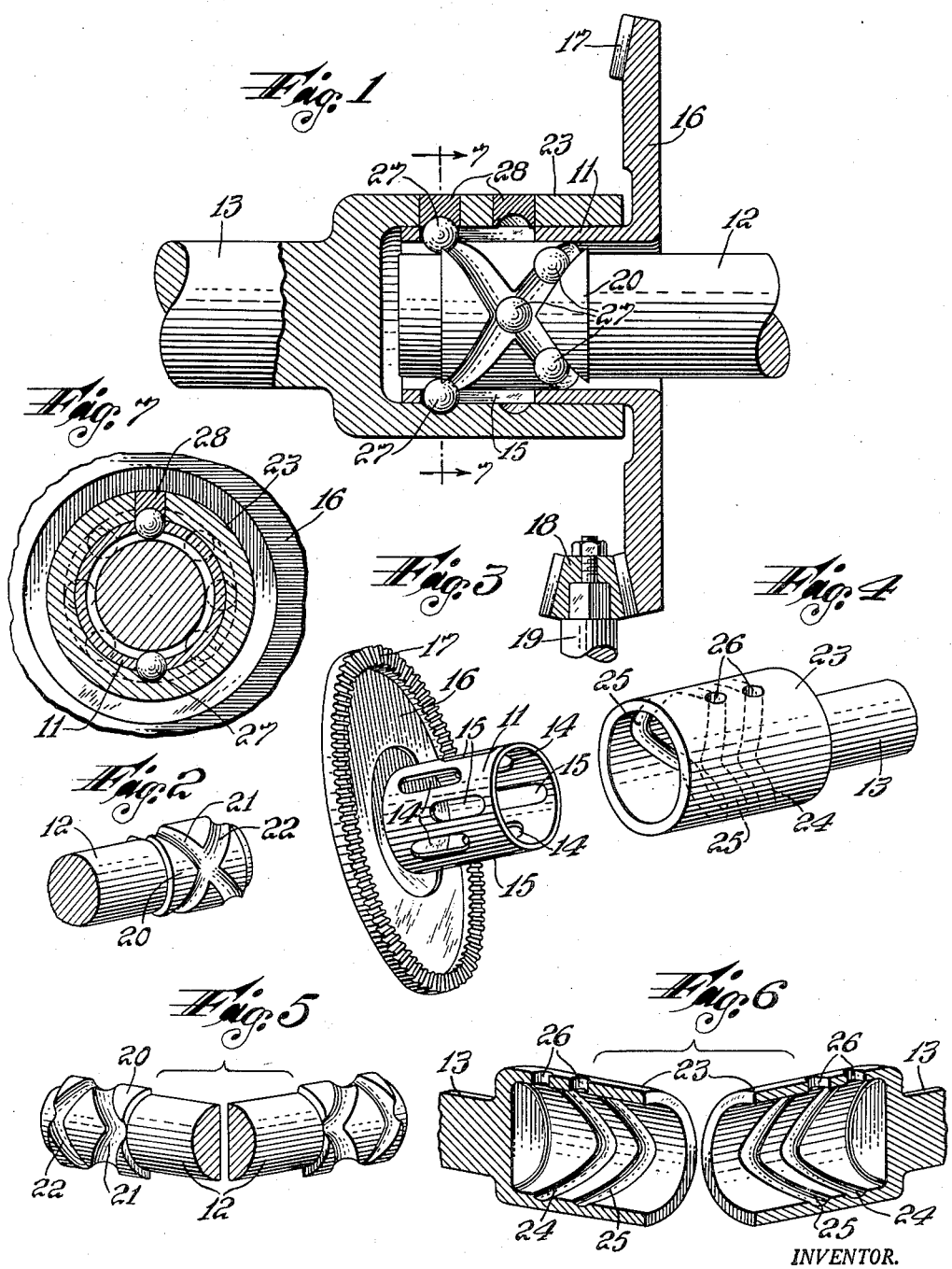

2,841,036

GEARLESS DIFFERENTIAL

Joseph L. Decker, New Brunswick, N. J.

Application November 6, 1952, Serial No. 318,976

2 Claims. (Cl. 74—650)

My invention relates generally to gearless differentials and specifically to gearless differentials which utilize the cam action of ball bearings in tracks for the purpose of transmitting power.

It is among the objects of my invention to provide a simple differential having a few durable parts that will be relatively easy and inexpensive to manufacture and will be durable.

Yet another object of my invention is to provide a device which will enable driving power to be transmitted to the wheels of a motor vehicle both in a forward and a rearward direction.

Still another object of my invention is to provide a device which will transmit driving power to the wheels of a motor vehicle regardless of the traction exerted by one of the wheels.

A still further object of my invention is to prevent spinning of any of the driven wheels of the motor vehicle and to assure full use of the motive power of the engine on turns, on slippery surfaces, and under snow or ice conditions.

These objects and advantages, as well as other objects and advantages, may be achieved by the device illustrated in the drawings in which:

Figure 1 is a sectional view of my differential;

Figure 2 is a view of the left shaft;

Figure 3 is a view of the driving cage;

Figure 4 is a view of the right drive shaft;

Figure 5 is a view of the left drive shaft cut in half to show the external tracks;

Figure 6 is a view of the right drive shaft cut in half to show the internal tracks, and Figure 7 is a cross-sectional view taken on the line 7—7 in Figure 1.

Referring now to the drawings in detail, my differential has three principal parts: a driving cage 11, a right shaft 12, and a left shaft 13. The driving cage 11 is tubular in form and has eight longitudinal slots 14, 15 disposed at 45 degrees from each other around the surface of the cage 11. These slots 14, 15 are arranged in staggered relationship so that one group of alternate slots 14 will be coextensive with the course of the corresponding right internal and external tracks and the remaining other group of alternate slots 15 will be coextensive with the course of the corresponding left internal and external slots. The drive cage 11 is provided with a perpendicular annular flange 16 at one end. This flange has a peripheral ring gear 17 which is cooperatively engaged with a pinion 18 on the driven shaft 19.

The right shaft 12 has an end portion 20 having a somewhat greater diameter than the main portion of the shaft 12, and it carries a pair of external intersecting tracks 21, 22. These tracks are arranged so that they change their direction every 90 degrees, first diverging and then converging on each other, until they intersect with each other 180 degrees apart on the end portion 20; from this point of intersection they diverge again. Their precise character is shown in Figure 5. The end portion 20 is so proportioned as to precisely fit within the driving cage 11.

The left shaft 13 has an end portion 23 which is tubular and of somewhat greater diameter than the main portion of the shaft 12. It has a pair of interior parallel tracks 24, 25. These tracks are arranged so that they change course every 90 degrees as do the corresponding tracks 21, 22. The end portion 23 has passages 26, 26 extending from its outer face to the tracks 24, 25 to enable the insertion of the ball bearings 27. When the ball bearings 27 are all in place, i. e., one in each slot of the driving cage 11, the passages 26, 26 may be closed by plugs 28.

The operation of my gearless differential is as follows: When the motor vehicle is travelling along a normal path with normal traction, the driving cage 11 rotates under compulsion of the vehicle's motor, and the cam action of the ball bearings 27, as they are impelled by the slots, cause the shafts and the driving cage to operate as a unit. When the vehicle is traversing an arc and the distance travelled by one wheel is greater than the distance travelled by the other, a positive driving force is nevertheless applied to both wheels. It is, therefore, apparent that if the driving cage 11 is moved in either direction, the slots 14 will move the ball bearings 27 into camming relationship with the tracks 21, 22, 24, 25 and will thereupon be forced against the cam surfaces thereof. Although the forces required to rotate the respective shafts and their speeds of rotation may be different, due to the turn radius or surface conditions, nevertheless, these forces will tend to work against each other so as to exert a constant driving effect without slippage.

I have referred to the driving cage 11 as having eight longitudinal slots. The number of slots is a matter of choice. They may be increased or decreased in number depending upon how many ball bearings it is desired to operate the device with.

I have also referred to pairs of tracks on each of the shafts. It is essential, however, that the corresponding external and internal tracks shall alternately pursue opposite courses in relation to each other, as appears in Figures 5 and 6.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although are not specifically catalogued herein.

I claim:

1. A gearless differential comprising a tubular driving cage, a plurality of longitudinal slots in the driving cage, a plurality of ball bearings in the slots, a first drive shaft having intersecting, external, continuous tracks alternately extending their courses toward opposite ends of the first drive shaft, said first drive shaft being disposed with its tracks within the driving cage and in camming relation with the ball bearings in the slots, a second drive shaft having a tubular end thereon and positioned over the driving cage; parallel, internal, continuous tracks in the tubular end of the second drive shaft alternately extending their courses toward opposite ends of the second drive shaft, and said tracks being disposed in camming relation with the ball bearings in the slots whereby the rotation of the driving cage impels the ball bearings into camming relation with the internal and external tracks thereby producing rotation of the drive shafts, and said tracks on the first and second drive shafts, each having a corresponding number of alternations of courses.

2. A gearless differential comprising a tubular driving cage, a plurality of alternately staggered longitudinal slots in the driving cage, a ball bearing in each of the slots, a first drive shaft having a pair of intersecting, external, continuous tracks each alternately extending its course toward opposite ends of the first drive shaft, said first drive shaft being disposed with its tracks within the driving cage and extending in opposite directions a distance equal to the length of a slot, said tracks and slots being disposed in camming relation with the ball bearings, a second drive shaft having a tubular end thereon which embraces the driving cage, a pair of parallel, internal continuous tracks in the tubular end of the second drive shaft alternately extending their course toward opposite ends of the second drive shaft and extending in opposite directions a distance equal to the length of a slot, said tracks disposed in camming relation with the ball bearings in the slots whereby the rotation of the driving cage impels the ball bearings into camming relation with the internal and external tracks, thereby producing rotation of the drive shafts, and said tracks on the first and second drive shafts, each having a corresponding number of alternations of courses.

References Cited in the file of this patent

UNITED STATES PATENTS

| | | |
|---|---|---|
| 1,723,100 | Voorhees | Aug. 20, 1929 |
| 2,034,318 | Wales | Mar. 17, 1936 |

FOREIGN PATENTS

| | | |
|---|---|---|
| 391,583 | Germany | Oct. 3, 1924 |
| 801,421 | Germany | Jan. 8, 1951 |